April 3, 1945.　　C. A. WIKEN ET AL　　2,372,699
CUTTING MACHINE
Filed July 18, 1941　　5 Sheets-Sheet 1

Fig. 1

Inventors
Christy A. Wiken,
Hugo V. Boehnke,
By Carl A. Hellmann,
Attorney April 3, 1945.    C. A. WIKEN ET AL    2,372,699
CUTTING MACHINE
Filed July 18, 1941    5 Sheets-Sheet 2

Inventors
Christy A. Wiken,
Hugo V. Boehnke,
By Carl A. Hellmann
Attorney

April 3, 1945.  C. A. WIKEN ET AL  2,372,699
CUTTING MACHINE
Filed July 18, 1941   5 Sheets-Sheet 3

Inventors
Christy A. Wiken,
Hugo V. Boehnke,

By Carl A. Hellmann,
Attorney

April 3, 1945.    C. A. WIKEN ET AL    2,372,699
CUTTING MACHINE
Filed July 18, 1941    5 Sheets-Sheet 4

Inventors
Christy A. Wiken
Hugo V. Boehnke
By Carl A. Hellmann
Attorney

Patented Apr. 3, 1945

2,372,699

UNITED STATES PATENT OFFICE 2,372,699

CUTTING MACHINE

Christy A. Wiken and Hugo V. Boehnke, Milwaukee, Wis., assignors, by mesne assignments, to The Delta Manufacturing Company, a corporation of Delaware Application July 18, 1941, Serial No. 403,048

20 Claims. (Cl. 164—60)

The present invention relates to devices for cutting materials, comprising broadly either a rotating cutter blade or a disk, for example, a rotatable disk made of abrasive material, suitably bonded to withstand the operating conditions, and commonly known as an "abrasive disk," means for furnishing power to rotate the same, means for moving the cutting element through a work piece and means for supporting the work piece in proper position to be cut.

More specifically the invention comprises a motor suitably connected by belt or gearing to an arbor for supporting a cutting element for rapid rotation and a cradle for permitting the motor and element jointly to turn about a pivot parallel to the axis of the cutter so as to cross the path of the work piece which is to be cut, a specific feature of the mechanism consisting of means for supplying a cooling and lubricating substance to the cutting element while in operation.

Other features of the invention consist in means for moving the cutting blade across the work piece, together with resilient means for counter-balancing the weight of the mechanism and restoring said mechanism to a position in readiness to cut the next work piece, and clear the path of one which has already been cut.

Another feature of the invention is to provide an improved adjustable stop for attachment to a fence for use in cutting stock into pieces of any desired length, whereby exact duplicates may be cut rapidly and efficiently.

A further object is to provide means whereby the stock being cut will be supported on both sides of the cut, thus preventing it from yielding or bending when partially severed, and making it possible to secure clean and true cuts free from burs. This is accomplished by providing a bridge in the table insert, beyond the cutter slot, and a discharge opening beyond the bridge, through which the severed pieces of stock will drop automatically.

An additional object is to provide a stock clamp which cooperates with the fence to receive and hold stock while being cut, so designed that the stock may be introduced from the front of the machine and need not be inserted endwise, a particularly important feature with long stock such as pipe or cable.

A feature of the machine resides in providing guards for the cutting tool, both above and below the work table, and in providing means for removing dust or sludge produced in the cutting of stock.

In order to explain the invention in greater detail, a specific embodiment has been selected for illustration, together with several alternative forms of coolant- and/or lubricant-feeding means for use therewith, which are described in the present specification and shown in the drawings accompanying the same and forming a part thereof.

In said drawings.

In all the figures similar elements are designated by the same reference characters.

Figure 1:
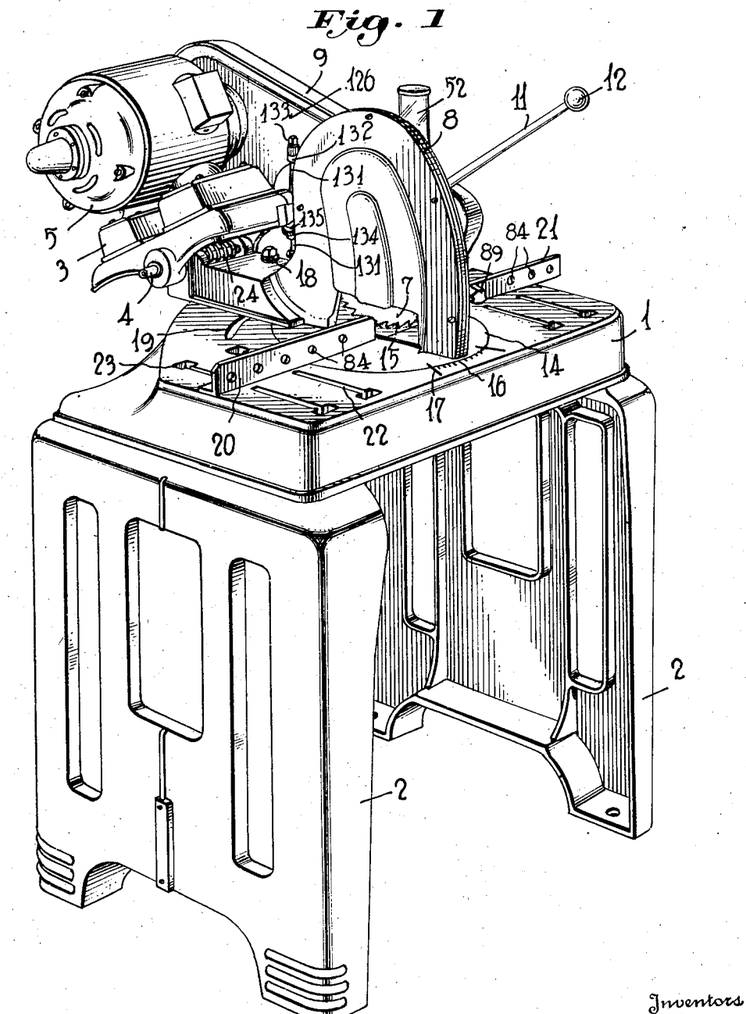
Fig. 1 is a perspective view, showing the machine as a whole, mounted on supports.
Figure 6:
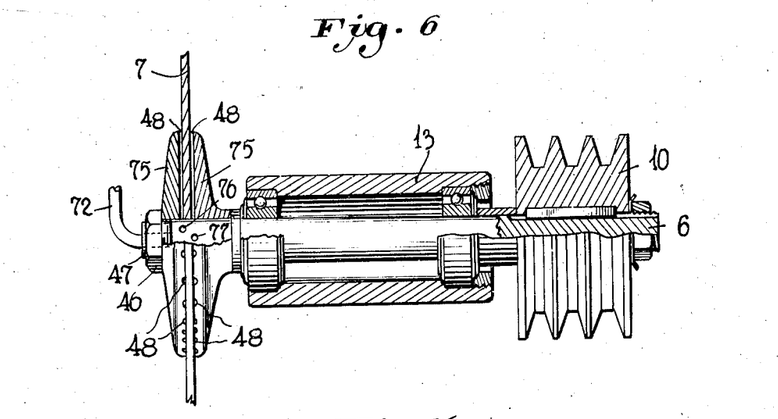
Fig. 6 shows partly in section the means for mounting the cutting element and shaft for rotation, the liquid here being fed as in Fig. 5, although of course, the same bearings and pulley may be used for all the types of liquid feed.

Referring first to Fig. 1, the machine comprises a base 1, mounted on suitable supports or legs 2. A motor base 3, mounted on a shaft 4 constituting a pivot, serves to support a motor 5, which supplies the power for the machine, and the shaft of which is connected by a suitable belt or belts to the shaft 6 (see Fig. 6) which carries the cutting element 7, here shown as a metal-cutting saw blade.

A protective casing 8 is provided and guards the element 7, which can move arcuately up and down therein, when the driving mechanism turns about the shaft 4 as an axis. A second casing or belt housing 9, surrounds the motor pulley and the pulley 10 driven thereby. While this is shown as a multiple-groove pulley, for use with a plurality of belts, this feature is not essential and a single belt may be substituted if preferred.

It will be noted that the guard 8 is shaped to cover the blade 7, only an arcuate slot or the like being left open to receive the driven shaft, and permit it to move about the pivot 4. A rod 11, preferably having a ball 12 at its end, is secured to the housing 9 or to the bearing sleeve 13, so that a downward pull or push applied manually to the rod or ball will cause the cutting blade 7 to move downward.

Such downward motion may continue below the level of the top of the base 1 by reason of a circular insert 14 having a slot 15 extending in a diametral direction, and permanently alined with the general plane of the cutting element 7. The said insert preferably has its upper surface flush with the top of the base 1, so as to form a continuous plane therewith, thus providing a work-receiving table. A scale 16 may be provided on one of said parts to cooperate with index marks such as 17 on the other part, to indicate the direction of the slot 15 with respect to the base 1.

In order to make it possible to vary the angle at which the cutting is accomplished, the insert 14 is preferably mounted rotatably in the base 1, a clamping screw 18 being provided for securing the mechanism in its adjusted position. The screw 18 enters the arcuate slot 19 and below the same any suitable nut or the like may be threaded thereon, so that by tightening the screw 18 the parts may be clamped together firmly.

A fence 20, 21 here shown as of "angle-iron" configuration is located on the table as shown and may be adjusted forward and back and clamped where wanted by any customary or conventional means. The fence is preferably made in two sections 20 and 21 as shown, which are ordinarily maintained in alinement with one another and serve to guide the work pieces. One reason for providing two sections is of course, to make it possible for the cutting blade 7 to pass downward into the slot 15 so as to permit cutting entirely through the work piece. Slots 22 and 23 may be provided in the table as shown for securing anything desired thereto, such as special guides or jigs for work pieces of unusual shapes, or for supporting fences such as 20 and 21 in various positions.

Figure 7:
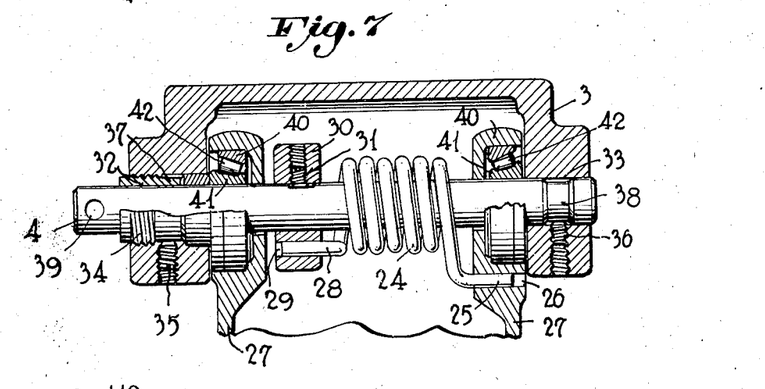
Fig. 7 is a fragmentary sectional detail showing a pivot and spring for adjusting the mechanism to compensate for the varying weights of various drive motors, so as to maintain proper balance.

It will be understood, of course, that the motor 5 and bracket 3 are usually relatively heavy so that it would be difficult to cause the same to pivot about the shaft 4 without counterbalancing means, and for this purpose a helical spring such as 24, best shown in Fig. 7 may be provided. This spring may have one end 25 engaged in a suitable aperture 26 in a relatively stationary part 27 of the mechanism, its other end 28 being engaged in an aperture 29 formed in a collar 30 which is secured to the shaft 4 in any suitable way, for example by means of the set screw 31. The spring 24 thus will tend to maintain the shaft 4 in a definite position. The motor base 3 is carried by the shaft 4 as shown in Fig. 7.

It will be noted that the base 3 has a threaded bore 32 at one end thereof and an unthreaded bore 33 at the other. The shaft 4 correspondingly is mounted in a sleeve having a threaded portion 34 which will fit in the threads at 32 so that the said shaft 4 may be inserted in proper place by holding the base 3 in alinement with the relatively stationary portion 27 and inserting the shaft 4 from the left hand side, finally turning it to make the necessary adjustment. The base 3 may then be secured to the shaft 4 and sleeve 34 by means of set screws 35 and 36 which will engage against the smooth undercut portions, 37 of the sleeve and 38 of the shaft respectively.

By turning the shaft 4 a suitable amount in one direction or the other, which may be done easily by inserting a rod or lever in the hole 39, it is possible to secure the desired tension on the spring 24, to provide the desired amount of counterbalance, whereupon the set screw 36 may be tightened to maintain such adjusted condition. In order to facilitate the rotation of the shaft 4, roller bearings or similar anti-friction means may be provided. For example in Fig. 7 the stationary element 27 has the outer races 40 seated therein, while the cooperating inner races 41 are carried by the shaft 4, the rollers 42 being interposed between said races in the customary manner. Any end-play in these roller bearings may be taken up by the sleeve 34. While such bearings are not essential, and may be omitted where necessary for cheapness of construction, their provision will nevertheless improve the ease of operation of the device.

The roller bearings eliminate end-play between the base 3 and the bracket 27. Even small end-play here would be multiplied greatly at the cutting blade, causing binding of steel blades and breakage of abrasive disks. This is an important feature of the present machine, which makes it possible to take up all end-play without affecting the ease of feeding the cutter into the stock. The sleeve 34 also makes it easier to assemble the mechanism, because a slight clearance, say one thirty-second of one inch, may be left between the brackets 3 and 27, and later taken up by screwing in the sleeve 34, toward the right-hand bearing 41, which in turn causes the other bearing 41 to bear against the bracket 3, thus taking up all play.

The arcuate guard casing 8 is centered about the axis of the shaft 4, so that the cutting blade 7 will move freely within such guard 8, thus shielding the operator as well as the cutting device, and also preventing the blade from throwing cuttings, grit, coolant or lubricant centrifugally therefrom.

Figures 2, 3, 4, 5:
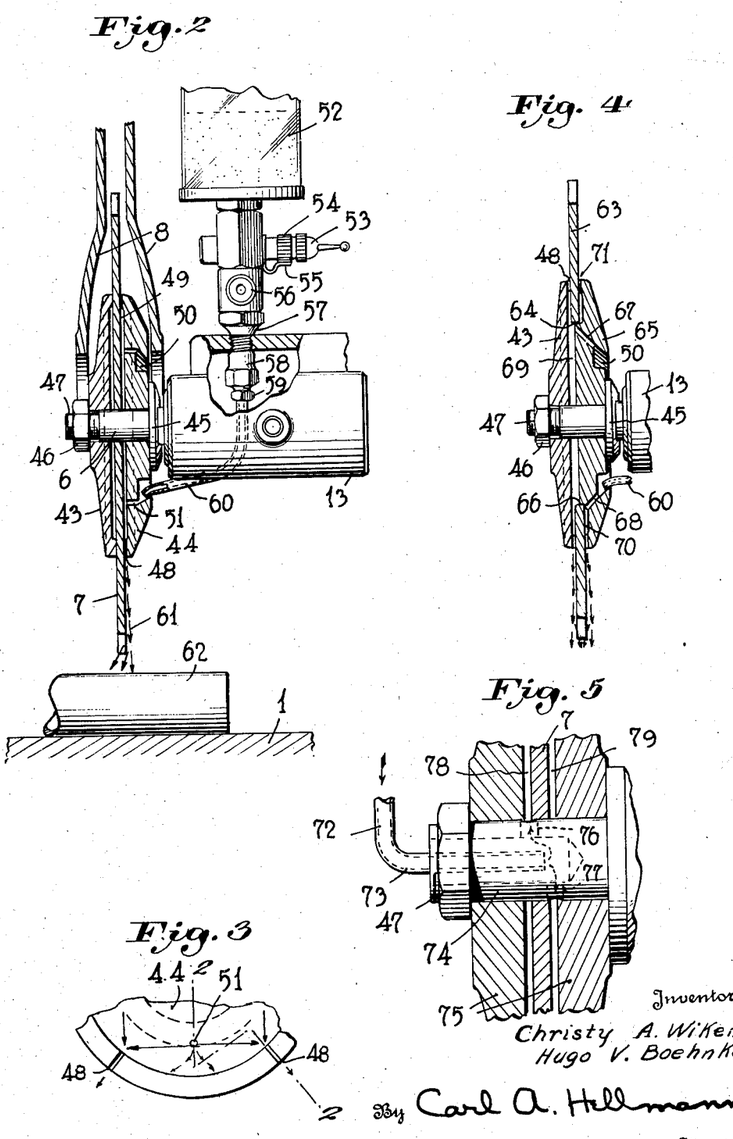
Fig. 2 is a partly sectional side elevation, on a larger scale and with portions broken away, through the cutting element and its shaft, showing means for supplying a lubricant or coolant thereto.
Fig. 3 is a corresponding fragmentary front elevation of the supporting flange for the cutting element, showing the passages for the liquid.
Fig. 4 is a similar fragmentary partly sectional side elevation through a modified type of cutting element and drive shaft, whereby the liquid is supplied to both faces of the cutting element.
Fig. 5 is a fragmentary partly sectional side elevation showing a still further modified form of drive mounting for the cutting element, wherein the liquid is supplied from a cavity in the central drive shaft itself, and reaches both faces of the cutting element.

Heretofore it has been difficult to provide satisfactory means for feeding the coolant to the cutting device, and one of the important objects of the present invention is to provide such means. One way of doing this is illustrated in Fig. 2.

Here it will be noted that the cutting blade 7 is mounted on the shaft 6 by means of two cupped or undercut flanges 43 and 44, which fit freely but without undue play upon said shaft. The shaft 6 may have an integral flange 45 thereon, against which abuts the central portion of the flange 44, as shown, the flange 43 being placed on the other side of the cutter 7 and secured by means of the nut 46 engaged on the threaded end 47 of the shaft.

It will be seen that by reason of the undercut or cupped construction of the flanges 43 and 44 the disk 7 is not strained at its center and is merely clamped annularly between the flanges, so that no breaking strains are produced when the nut 46 is tightened. The undercut portion of the flange 44 also serves a further purpose, namely, it acts as a passage for the coolant. To accomplish this the rim of the flange 44 may be provided with substantially radial grooves 48 of any desired number, so that instead of having a close and tight contact with the cutter element 7, radial passages are provided at intervals through which liquid may pass.

To feed such liquid into the space 49 produced by the undercutting, a chamfered groove 50 is here provided in the opposite face of the flange or washer 44, the inclined surface of said groove being arranged so that gravity and centrifugal force will combine to maintain the liquid at the outside or bottom of the groove, whence it may pass into the space 49 through suitable apertures 51 passing through the said flange.

In order to provide coolants, a suitable container 52 may be mounted upon the housing 13 with a shut-off valve 53 and an adjusting collar 54 having a locking means 55, such as are often used in sight-feed lubricators. A suitable peep hole 56 will indicate the rate of drip of the liquid in the customary way. Fittings 57, 58, and 59 will support the container 52 on the housing 13 and also will hold the discharge tube 60 in proper position to feed the coolant into the groove 50.

The arrows 61 indicate diagrammatically the flow of the coolant, which passes on one side of the tool 7 and impinges on the work piece 62 mounted on the table 1. While the flow takes place along only one face of the cutting element, yet upon reaching the work piece it is clear that some of the coolant will enter the kerf made by the cutting disk so as to lubricate and/or cool the entire cut.

The disadvantage above mentioned may be eliminated by the modified construction illustrated in Fig. 4. Here the cutting tool 63 has a much larger central opening as indicated at 64, and is mounted between a flange 43, identical with that of Fig. 2, and the companion flange 65 which is materially different from the flange 44 of the previously described form. The shaft 6, nut 46, washer 45, and bearing sleeve 13 may be the same as those of Fig. 2.

The flange 65 has a central portion 66 of proper diameter to fit within the opening 64 of the cutting tool 63 as shown, to center and support the same in proper position. An undercut groove 50 is provided in the flange 65 to receive the end of the coolant-feeding tube 60, which leads to the reservoir 52 identical with that of Fig. 2, not shown in the present figure. Passages 67 and 68 are provided in the flange 65 to provide communication respectively with the space 69 and the space 70 on opposite sides of the cutting-tool 63, and passages 48 and 71 lead radially outward from these spaces to permit the outflow of the coolant adjacent both faces of the cutting tool, as indicated by the arrows.

This form of device will therefore cool and lubricate both sides of the cutter and cut, and thus provide superior service, especially in cases where it is difficult to secure a flow of coolant between the tool and the work piece. A disadvantage of this form of device, however, is that owing to the large hole 64 in the disk 63, necessary for mounting it in this manner, standard cutting tools with the customary small holes fitting about the wheel shaft 6 cannot be used.

The further modified form illustrated in Fig. 5 remedies this defect, without losing the advantage of providing a flow of coolant along both faces of the disk. In this form the coolant flows through a tube 72 which is bent as shown at 73, so that its end may enter into a cavity or bore 74, in the end of the driven shaft 6. The cutting blade 7, which is here of standard type, is mounted on the shaft 6 between flanges 75, 75 which may have radially arranged passages preferably identical with those of the flange 43 of Fig. 4, that is they have the radial passages 48 (see Fig. 6) so that liquid may thus be discharged along both faces of the tool 7.

Apertures 76 and 77 communicating with the bore 74 are provided to establish communication between said bore and the spaces 78 and 79 on opposite sides of the disk 7. In this form it is clear that centrifugal force and gravitation will cooperate to cause the coolant to flow radially outward along both faces of the disk, thus cooling the same and also lubricating both sides of the cut.

The operation of the invention will be clear from the above description of the structures involved, but may be summarized briefly as follows:

Assuming that it is desired to cut a work piece of such nature and at such speed that lubrication and cooling of the cutting blade 7 are desirable or requisite, a suitable cooling and/or lubricating liquid will be placed in the reservoir 52 and the mechanism adjusted to feed the proper number of drops per minute into the tube 60.

This liquid will then flow along one or both faces of the cutting blade 7, under the combined action of gravitation and centrifugal force, which will cause said liquid to enter forcibly into the kerf in the work piece. The rate of cut is of course, controlled by the speed with which the lever 11 is brought down manually, and the spring 24 which has preferably been adjusted to overbalance the mechanism slightly, will serve to retract the cutting-blade from the work piece when pressure on the lever 11 is relaxed.

By turning the mechanism about a vertical axis passing through the center of the insert 14, the angle between the cutter 7 and the work piece may be adjusted as desired, and by shifting the fence members 20 and 21 to various positions, different work pieces may be accommodated readily.

All the mechanism is supported by the insert 14 in such a way that in rotating thus about a vertical axis the alinement of the various parts is not disturbed, and the coolant reservoir as well as the guard 8 for the cutting blade all move together as a unit, thus materially simplifying the structure and ease of operation and adjustment of the machine.

Figure 8:
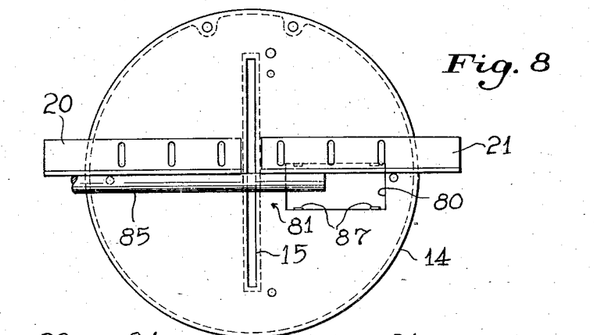
Fig. 8 is a plan view of an insert for use with the machine.
Figure 9:
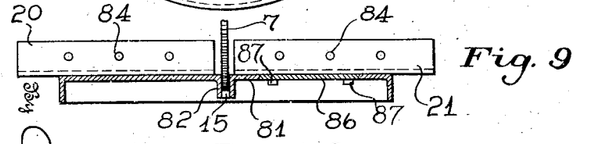
Fig. 9 is a section therethrough on the vertical plane indicated by the line 9—9 of Fig. 8.

The insert 14, shown in detail in Figs. 8 and 9, is preferably a disk having a depending flange 83 at its outer edge, fitting in the hole in table 1 as shown in Fig. 1. It is provided with a central slot 15 to receive the cutter blade 7 or 63, said slot having thickened edges formed by the rib 82. A hole 80, preferably rectangular, is provided in the insert to allow the pieces cut off from the stock 85 to fall through. A strip of material 81 is left between the hole 80 and the slot 15, to form a bridge upon which the overhanging (right-hand as shown) end of the stock 85 may rest during the cutting, which prevents the cut piece from yielding when only partly severed, as would occur if the hole 80 extended into the slot 15.

While the hole 80 is very useful in many applications of the machine, at times it may be desirable to have no such hole. This situation may of course be met by providing an additional insert without the hole, or preferably by providing a separate closure such as 86, which will fit in the hole and have its upper surface flush with that of the disk 14. This piece 86 is shown in place in Fig. 9, supported for example on lugs 87 as shown.

Figure 10:
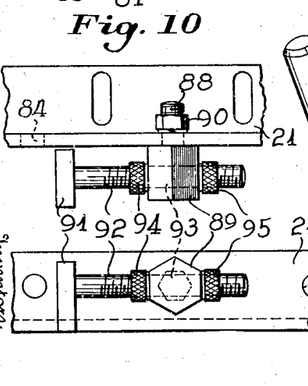
Fig. 10 is a detail, in plan view and on a larger scale, of an adjustable stop for the stock being cut.
Figures 11, 13:
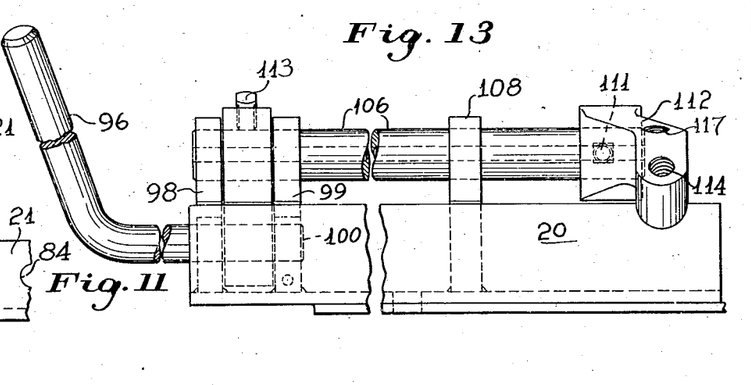
Fig. 11 is a front view thereof, the fence being shown partly broken away.
Fig. 13 is a front elevation thereof, partly broken away.

In order to facilitate cutting a number of pieces of the same length, when desired, an adjustable fence stop may be provided, as shown in detail in Figs. 10 and 11. The fences 20 and 21 are provided with holes 84 through any one of which will fit the screw 88 formed as a part of the head 89 or secured thereto if preferred.

The head is preferably hexagonal as shown, to facilitate holding it by a wrench, and a nut 90 is threaded on the screw 88 to hold the head 89 securely at the selected hole. The stop element 91 has a screw 92 extending therefrom as shown, and passing through a smooth bore 93 in the head 89, as shown. Knurled nuts 94 and 95 are threaded on the screw 92, and thus the stop 91 may be adjusted to correct position and secured firmly by manipulating the said nuts 94 and 95.

Figure 12:
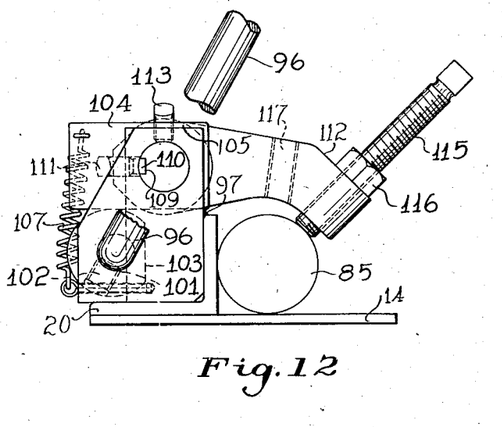
Fig. 12 is an end elevation of a clamp for holding stock against the table and fence.

Referring now to Figs. 12 and 13, there is shown a clamp for holding stock or work pieces to the fence and table of the machine, for cutting. The fence 20 has secured thereto, as by the weld 97, a pair of plates 98 and 99, in which is journalled the bent end 100 of a lever 96. An excentric or cam 101 is secured to the portion 100 by means of a headless set screw 102, so that when the lever 96 is pushed back, the flat surface 103 of the cam will be up, allowing rear end 104 of upper lever 105 to descend in response to the pull of a spring 107. This lever is secured to one end of the rod 106, which extends to the right along fence 20, and is journalled in plates 98 and 99 at one end and in plate 108 at the other, all carried by the said fence.

The rod 106 has a groove or keyway 109 extending along it, in which engages the reduced end 110 of set screw 111, threaded into the lever 112, thus forcing the lever 112 to rise or fall when the rod 106 turns. At the other end of rod 106 is the lever 105, also secured thereto by a set screw 113, threaded through the lever 105, so that the rod 106 will turn when this lever is moved.

At the free outer end of lever 112 is a threaded bore 114, into which is screwed the clamping screw 115, which may be held in adjusted position by the lock nut 116. This makes it possible to adjust the screw 115 properly to hold a round piece of stock 85 of any diameter within the range of the clamp. When the handle 96 is pushed backward, the clamp will open sufficiently to permit the stock 85 to be taken out forward, that is, toward the operator, thus making it possible to clamp long rods, pipes, cables, etc., without requiring them to be introduced endwise, and thereby speeding up the work very materially.

A second bore 117 may be provided also in the lever 112, to receive the screw 115 when flat or rectangular stock is to be clamped.

It will be seen that this clamp secures the stock or workpiece in the V formed by the fence 20 and the table insert 14. This has the advantage that the clamping relationship remains unchanged when the unit is moved on the table. The pressure exerted on the workpiece may be varied as desired to suit the stock being cut, by turning the screw 115, and once it is locked, it remains so automatically, until the clamp is released intentionally, in other words, the clamping system is self-locking.

Figure 14:
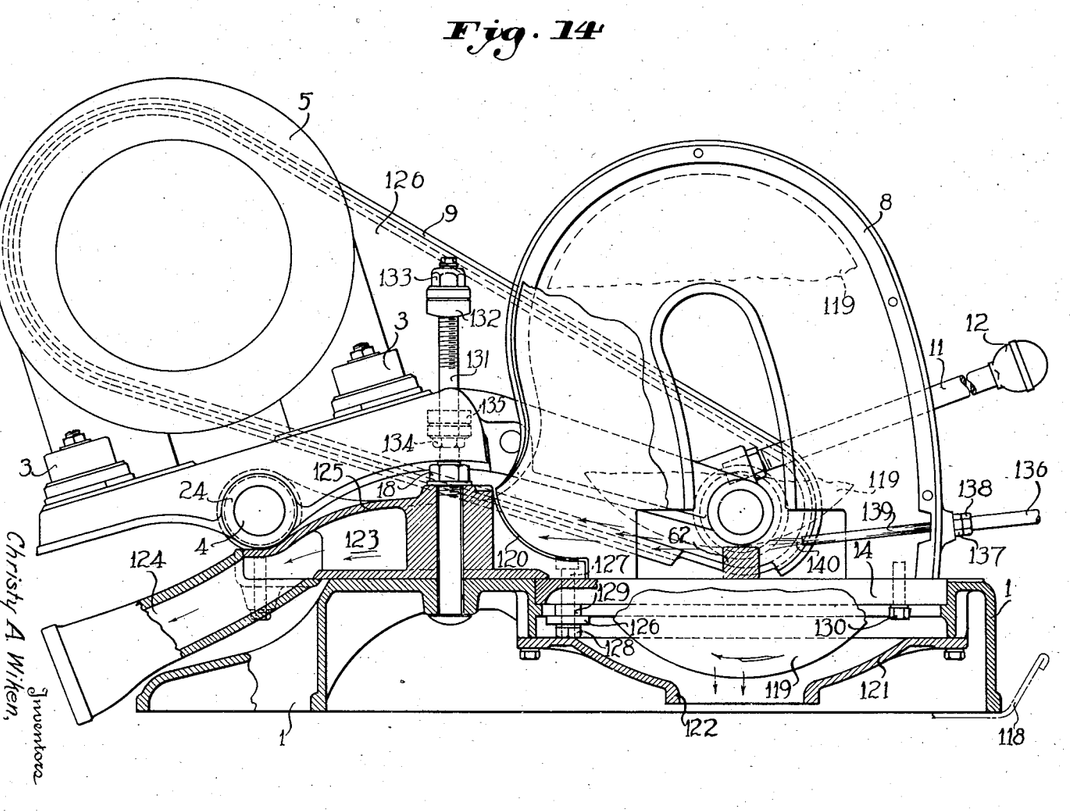
Fig. 14 is a sectional elevation through the machine, looking to the right, on a plane adjacent the left face of the cutting tool, and showing means for guarding the tool from beneath as well as means for exhausting dust, cuttings, and other waste from the machine.

Referring now to Fig. 14, it will be seen that the machine is here shown with an abrasive type of cutter mounted therein, to illustrate its adaptability to wet cutting with this style of cutter. A suitable coolant, such as a water and soda solution, may be fed to the wheel 119, preferably by delivering it to the same, at or near the point where it is cutting the stock.

Figure 15:
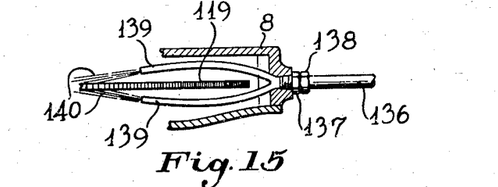
Fig. 15 is a fragmentary, partly sectional, detail of means for feeding jets of coolant to the tool of Fig. 14.

One way of doing this is shown in Figs. 14 and 15. A tube or pipe 136 is provided, passing through the outer wall of the guard casing 8, and held in place in any suitable way, as by the nut 137 and the lock nut 138. Within the casing this tube is divided into two branches 139, which extend on opposite sides of the cutting wheel 119, as best shown in Fig. 15. The coolant is fed into the tube 136 from any suitable source, such as a pressure supply or an elevated reservoir, as in usual practice. The jets of coolant 140 will impinge against the wheel and the stock being cut, thus cooling the same and also assisting in carrying off the grit and cuttings.

It will be understood however that it is not always necessary to use a coolant. When the machine is used the sparks and other waste will pass off mainly through the rear opening 120 in the guard 8, to the passage 123 and the suction outlet 124. The outlet nozzle swivels with the insert 14. A small portion of the waste will enter the lower guard 121 which is located below the surface of the table. This lower guard is funnel shaped and curved to correspond to the cutter, and has a central outlet 122 for drawing off any waste that collects therein. A pan 118 may be placed under the machine to collect the discharged liquid and waste, when coolant is used, the liquid being available for re-use, if desired.

The lower guard 121 is however intended mainly to prevent injury to the operator. Should he absent-mindedly raise his knee under the machine, this guard will protect him from contact with the cutting wheel or other tool when in depressed position.

The insert 14 is held rotatably in base 1 by washers 126 engaged on bolts 127, and having nuts 128 thereon, spacing rings 129 being interposed between the washers 126 and the under surface of the insert, or if preferred made integral with the said washers.

The guard 8 is secured to the insert in any preferred way, for example by screws such as shown at 130 (shown in Fig. 14).

The belt guard shown in Fig. 1 has an outer portion 9 which is substantially a box open to the left, and a cover 126 for said box. This cover fits loosely within the box 9 and engages three pads or lugs therein, which retain it properly spaced. A single stud bolt passing through both sides of the guard holds these parts together, so that thus only a single nut needs be taken off to permit access to the belts and pulleys, by removing the portion 9 of the guard.

The range of movement of the frame 3 with respect to the base 1, about the pivot 4, is preferably limited by rubber bumpers or the like, 132 and 135, shown in Fig. 14. These may be held by cupped nuts 133 and 134 respectively, threaded on the vertically arranged stud 131, which is secured to the support for frame 3, which also carries shaft supports 27 shown in Figure 3. The respective buffers 132 and 135 are thus capable of being adjusted vertically and will be struck by the upper and lower surfaces of the frame 3 at the corresponding desired limits of its pivotal movement.

While a specific embodiment of the mechanism has been disclosed herein in detail, together with several alternative types of coolant feeding means, which are at present believed to embody the preferred forms of the machine, it is obvious that many changes may be made in both the machine and the liquid-feeding means without departing from the spirit of the invention.

It is, of course, clear that the liquid-feeding means is applicable to many other types of machines in addition to the one specifically illustrated, and that it is not by any means confined to the lubrication and/or cooling of high-speed metal-cutting blades, but may also be applied to any other type of rotary cutter, such as an abrasive type cutter, or milling cutters, usually operating at a materially lower speed, and many other rotary cutting devices.

The invention is therefore not to be considered as limited to the specific structures illustrated, but is defined solely by the following claims.

We claim:

1. In a machine for cutting material, a support for said material, said support having a narrow slit therein to admit the cutter, and having an opening laterally beyond one side of said slit, to provide means for discharging the pieces cut from said material, there being a bridge between the said slit and the opening, said bridge affording support for said material while being cut and preventing imperfect cutting due to yield of the material before it is completely severed.

2. In a machine for cutting material, a support for said material, a fence adjustably secured to said support, and an adjustable stop for positioning said material, said stop comprising a head securable to the fence, a stop carried by said head and movable transversely thereof, and means for securing the stop in desired adjusted position on said head.

3. In a machine for cutting material, a support for said material, a fence carried by said support and clamping means for holding the material to the fence and support while being cut, said clamping means comprising a journal carried by the fence, an operating lever having a portion journalled therein, a cam mounted on said portion, a rod extending substantially parallel to the fence and also journalled in said journal, a lever secured to the rod and bearing on the cam whereby rotation of the cam will shift said lever and thereby turn the rod, and an arm extending from said rod and having means adapted to bear against the material to be cut when the operating lever is actuated.

4. In a machine for cutting material, including a revolving cutter, a table for the material to be cut, said table having an opening through which the cutter may project, and a guard below the table to prevent accidental contact with the cutter, said guard being funnel-shaped and having an outlet at its lowermost portion to discharge any waste or cuttings produced in the operation of the machine.

5. In a cutting machine, a base upon which work-pieces may be supported during cutting; a frame assembly disposed in cooperative relationship to said base and carrying a cutting device rotatable about an axis substantially parallel to said base; a pair of spaced anti-friction bearing means mounting said frame for rocking movement about an axis parallel to the axis of said cutting device and adapting the latter for movement toward a work-piece on said base, said bearing means embodying rolling elements and races cooperating in sufficiently tightly rolling engagement to preclude movement of said frame in any direction other than in a plane exactly normal to the axis of said cutting device, thereby avoiding subjecting the latter to damaging side stresses during cutting; and means for maintaining said relationship of said rolling elements and races.

6. In a cutting machine, a base upon which work-pieces may be supported during cutting, providing a pair of rigid spaced supports; an anti-friction outer bearing race tightly fitting in an opening in each support; a plurality of rolling bearing elements and an inner bearing race cooperating with each of said outer bearing races; a shaft extending from one support to the other and snugly fitting within said inner bearing races for axial sliding movement therein; a frame having spaced portions tightly fitting said shaft adjacent said bearings; means for securing said frame to said shaft; a rotatable cutter mounted on said frame and adapted to be fed toward a work-piece on said base; a motor for driving said cutter; and means, acting upon one of said inner races and reacting against one of the spaced portions of said frame, for eliminating all axial and radial play in said bearings, for positively constraining said cutting device for swinging movement in a plane exactly normal to the axis of said cutter.

7. The cutting machine defined in claim 6, wherein said motor and cutter are so located with respect to said shaft as to cause said cutter to tend to rock said frame toward said base; and a coiled torsion spring is employed to urge said frame upwardly against the action of said motor and cutter, said spring being mounted upon and secured at one end to said shaft and having its other end secured to one of said supports.

8. In a cut-off machine, a base upon which work-pieces may be supported during cutting; a frame mounted for pivotal swinging movement upon said base in a substantially vertical plane; a cutter mounted for rotation upon the frame adjacent its front end and adapted to be brought into cutting relationship with work-pieces supported on said base; a motor carried by said frame and drivingly connected to said cutter, said cutting device and said motor being so located with respect to the pivot of said frame that said cutter over-balances said motor and normally tends to rock said frame toward said base; and resilient means for constantly overcoming the tendency of said frame to bring said cutter toward the work-piece.

9. The machine defined in claim 8, wherein said resilient means comprises a torsion spring operably connected at opposite ends to said base and frame and embodying means for adjusting one end into a plurality of angular positions, for imparting various counter-balancing actions thereto.

10. In a cutting machine, a table upon which a work-piece may be supported during a cutting operation; a fence mounted on said table and against which the work-piece is adapted to bear during the cutting operation; and work clamping means, operable to contact the work-piece and maintain it in tight engagement with both the fence and a portion of the table adjacent said fence, for positively restraining it against movement during cutting.

11. In a cutting machine, a table for supporting work-pieces in cooperative relationship to a cutting device; a fence mounted on said table; a work clamping device rockably mounted on said fence and operable to engage and force a work-piece into tight engagement with both said table and said fence; and a self-locking mechanism for rocking said work holding device into work holding position.

12. The cutting machine defined in claim 11, wherein said work clamping device comprises a rockable arm and a work contacting element adapted for mounting on said arm in a plurality of adjusted inclinations and operable to urge the work into engagement with the fence and table with forces having selectively variable horizontal and vertical components.

13. The cutting machine defined in claim 11, wherein said work clamping device embodies means adapting it for cooperation with different sized work-pieces, whereby the range of movement of said work clamping device and said mechanism may be maintained substantially constant for all sizes of work-pieces.

14. The cutting machine defined in claim 11, wherein said work clamping device comprises a rockable arm carrying an adjustable screw adapted to contact the work-piece.

15. The cutting machine defined in claim 11, wherein means are provided for securing said fence to said table in any one of a plurality of adjusted positions with respect to said cutting device, for varying the cutting action.

16. In a cutting machine, a work guiding fence adapted to be supported on a work table; a work clamping arm rockably mounted on said fence and adapted to engage a work-piece and force it against both the table and fence; and means for rocking said arm, comprising a shaft mounted for rocking movement about an axis parallel to said fence and carrying a cam coacting with a portion of said shaft.

17. The cutting machine defined in claim 16, together with resilient means constantly urging said shaft portion into contact with said cam, and operable to retract the shaft and work clamping arm into the inoperative position.

18. In a cutting machine, a base adapted to support a work-piece during a cutting operation; a support having pivot means mounting it on said base for rocking movement about a vertical axis into any one of a plurality of adjusted positions; a frame pivotally mounted on said support for rocking movement about a substantially horizontal axis and carrying a rotatable cutter adapted to be fed toward a work-piece on said base; and stop means, located adjacent said pivot means, for limiting movement of said frame toward and away from said base in all adjusted positions of said support on said base.

19. The cutting machine defined in claim 18, wherein said stop means comprises an upright member on said support passing upwardly through an opening in said frame, and a pair of vertically spaced elements on said member coacting with the upper and lower surfaces of said frame.

20. In a cutting machine, a base having an insert upon which work-pieces may be supported during cutting; means mounting said insert for adjustment about a vertical axis; a support rockable in unison with said insert and carrying a frame rockable about a horizontal axis and carrying a rotatable cutter movable toward said insert; a guard for said cutter mounted on said insert having an opening at its rear adjacent said support and adapted to discharge cuttings and the like during operation; passage means in said support for receiving material discharged from said guard; and means for removing said material from the interior of said support, comprising suction conduit means communicating with said passage means.

CHRISTY A. WIKEN.
H. V. BOEHNKE.